United States Patent
Magnusson et al.

(10) Patent No.: US 12,507,193 B2
(45) Date of Patent: Dec. 23, 2025

(54) NODE FOR USE IN POSITIONING OF A WIRELESS UNIT, AND RELATED METHODS AND SYSTEMS

(71) Applicant: Faster Mobile Engagement Sweden AB, Stockholm (SE)

(72) Inventors: Niklas Magnusson, Täby (SE); Patrik Dai Javad, Stockholm (SE)

(73) Assignee: Faster Mobile Engagement Sweden AB, Stockholm (SE)

( * ) Notice: Subject to any disclaimer, the term of this patent is extended or adjusted under 35 U.S.C. 154(b) by 424 days.

(21) Appl. No.: 18/013,432

(22) PCT Filed: Jul. 2, 2021

(86) PCT No.: PCT/EP2021/068318
§ 371 (c)(1),
(2) Date: Dec. 28, 2022

(87) PCT Pub. No.: WO2022/003153
PCT Pub. Date: Jan. 6, 2022

(65) Prior Publication Data
US 2023/0269691 A1    Aug. 24, 2023

(30) Foreign Application Priority Data
Jul. 2, 2020 (SE) .................................... 2050832-1

(51) Int. Cl.
*H04W 60/04*     (2009.01)
*H04W 40/24*     (2009.01)
(Continued)

(52) U.S. Cl.
CPC ......... *H04W 60/04* (2013.01); *H04W 40/246* (2013.01); *H04W 48/12* (2013.01); *H04W 68/06* (2013.01); *H04W 76/18* (2018.02)

(58) Field of Classification Search
None
See application file for complete search history.

(56) References Cited

U.S. PATENT DOCUMENTS

| | | | | |
|---|---|---|---|---|
| 2011/0117913 | A1* | 5/2011 | Masuda | H04W 48/04 455/435.1 |
| 2013/0150035 | A1* | 6/2013 | Chande | H04W 24/02 455/435.1 |

(Continued)

FOREIGN PATENT DOCUMENTS

| | | |
|---|---|---|
| CN | 107333311 B | 4/2020 |
| WO | 2018069180 A1 | 4/2018 |

OTHER PUBLICATIONS

"5G ; Non-Access-Stratum (NAS) protocol for 5G System (5GS) ; Stage 3 (3GPP TS 24. 501 version 15. 5. 0 Release 15)", ETSI Technical Specification, European Telecommunications Standards Institute (ETSI) , 650, Route Des Lucioles ; F-06921 Sophia-Antipolis ; France.

*Primary Examiner* — Jenee Holland
(74) *Attorney, Agent, or Firm* — Flaster Greenberg P.C.

(57) ABSTRACT

The present inventive concept relates to a node for use in positioning of a wireless unit, the node comprising: a transmitter arranged to broadcast system information arranged to trigger a registration, the system information comprising a first registration area code; a receiver arranged to receive registration requests from wireless devices in receipt of the system information, wherein the node is arranged to, in response to a registration request received from any wireless device in receipt of the broadcasted system information, transmit, via the transmitter, a response to said any wireless device indicating that the registration request is rejected, and change the first registration area code to a second registration area code when a registration area code update condition is met.

8 Claims, 10 Drawing Sheets

(51) Int. Cl.
*H04W 48/12* (2009.01)
*H04W 68/06* (2009.01)
*H04W 76/18* (2018.01)

(56) References Cited

U.S. PATENT DOCUMENTS

| | | |
|---|---|---|
| 2015/0319726 A1 | 11/2015 | Brock |
| 2017/0094461 A1 | 3/2017 | Harrow |
| 2017/0142637 A1* | 5/2017 | Brock .................. H04W 60/04 |
| 2018/0242275 A1 | 8/2018 | Militano et al. |
| 2019/0320411 A1 | 10/2019 | Gaigalas et al. |
| 2022/0377653 A1* | 11/2022 | Zhu ....................... H04W 76/11 |
| 2022/0377659 A1* | 11/2022 | Venkataraman ...... H04W 48/12 |
| 2023/0146162 A1* | 5/2023 | Chun .................... H04W 60/00 |
| | | 455/435.2 |
| 2023/0156583 A1* | 5/2023 | Murray ................. H04W 48/20 |
| | | 370/329 |
| 2023/0262637 A1* | 8/2023 | Sugawara ............. H04W 60/04 |
| | | 455/435.1 |
| 2023/0269691 A1* | 8/2023 | Magnusson ........... H04W 76/18 |
| | | 370/329 |

\* cited by examiner

NODE FOR USE IN POSITIONING OF A WIRELESS UNIT, AND RELATED METHODS AND SYSTEMS

CROSS-REFERENCE TO RELATED APPLICATIONS

This application is the 371 National Stage of International Application No. PCT/EP2021/068318, filed Jul. 2, 2021, which claims priority to Swedish Application No. 2050832-1, filed Jul. 2, 2020, the disclosures of which are incorporated herein by reference in their entireties.

TECHNICAL FIELD

The inventive concept described herein generally relates to the field of telecommunications. In particular, the inventive concept relates to a node for use in positioning of a wireless unit, and related methods and systems.

BACKGROUND

In order to fully appreciate the present inventive concept, architecture and core functionality of existing radio access technology will initially be presented. It is to be understood that although specific standards are used to exemplify radio access technologies, the present inventive concept is not limited to these technologies, and may in contrast function and provide technical effects and advantages, as will be further described in the present disclosure, also in other existing or future technologies.

As shown in FIG. 1, in 3GPP LTE, a user entity (UE) (20) is served by or camping at a radio access node in the form of an E-UTRAN NodeB (eNB) (18), controlled by an evolved packet core node in the form of a Mobility Management Entity (MME) by an S1-MME and to a System Architecture Evolution (SAE) Gateway by an S1-U (MME/S-GVV) (22). When the UE moves around, its connection may be transferred to another base station/eNB (18). The handover from one base station to another base station can be controlled based on signalling via the interface S1 to the core network. Alternatively, there might be direct interfaces X2 established between base stations.

FIG. 1 illustrates an example of an LTE type mobile communications system (10). An E-UTRAN (12) includes eNBs (18) that provide E-UTRA user plane and control plane protocol terminations towards the user equipment (UE) terminals (20) over a radio interface. An eNB is sometimes more generally referred to as a base station, and a UE is sometimes referred to as a mobile radio terminal, mobile device or a mobile station.

Each base station broadcasts per cell a signature sequence over an entire cell area for the UE terminals to detect and measure. Measurements performed by the UE terminals on the received signal strength of different base station signature sequences are used in most radio communication systems (e.g. GSM, WCDMA, LTE, WCDMA-2000 etc.) to perform, e.g., initial cell selection and handover decisions.

NR/5G also uses signature sequences, corresponding to 1008 physical cell identifiers. UEs can be configured to measure signal power and/or signal quality of serving and neighbour cells, based on these signature sequences. In LTE, these measurements are denoted reference symbol received power (RSRP) and/or reference symbol received quality (RSRQ). These RSRP/RSRQ measurements are used when performing initial cell selection for UEs to "camp" on and subsequent cell reselection as well as when performing handovers of UE connections to ensure that the UEs are associated to the relevant cells over time.

UEs continuously monitor system information as well as the signature sequences broadcasted by base stations within range to inform themselves about "candidate" base stations in the service area. When a UE needs access to services from a radio access network, it sends a request to a suitable base station, typically a base station with the most favourable radio conditions. As shown in FIG. 1, the base stations may be interconnected with each other by means of an X2 interface. The base stations are also connected by an S1 interface to an Evolved Packet Core (EPC) (14) which includes a Mobility Management Entity (MME) by an S1-MME and to a System Architecture Evolution (SAE) Gateway by an S1-U. The MME/SAE Gateway is as a single node (22) in this example. The S1 interface supports a many-to-many relation between MMEs/SAE Gateways and eNBs. The E-UTRAN (12) and EPC (14) together form a Public Land Mobile Network (PLMN). The MMEs/SAE Gateways (22) are connected to directly or indirectly to the Internet (16) and to other networks.

When a UE is in idle mode, it selects a cell to camp on based on some selection parameters. The purpose is to find a cell to initiate communication with when the need arises. The communication connection can be initiated based on the UE initiative resulting in a random access to the network to request for a connection, or on the network initiative as a paging message to the UE triggering a random access. When the UE is in idle mode its location is monitored on a registration area granularity. A registration area comprises one or more cells, and an associated registration area code is broadcasted by the cells of the registration area. When a UE detects that it is camping on a cell broadcasting a different registration code, it notifies the network by registration procedure with the new registration area. In LTE/NR, the registration area is named tracking area, the registration code the tracking area code or tracking area identifier, and the procedure of registration due to camping on a cell with a different registration code is denoted tracking area update. When a UE is receiving a registration area code (RAC) reject from a cell (tracking area update reject in LTE terms) with a rejection cause that is among a set of rejection causes, the UE will add the RAC to a forbidden list in the UE memory/storage. The forbidden list has limited number of entries, and when it is full, the oldest item in the forbidden list is replaced (a first in first out memory). The length of the forbidden list in LTE/4G is 40 Tracking area codes (or tracking area identifiers).

In order to perform a handover in LTE from a source cell to a target cell, the two involved cells must first set up a neighbour cell relation (NCR). The NCR contains at least a physical cell identifier (PCI) (or other short cell identifier) and a cell global identifier, E-UTAN Cell Global Identifier (ECGI) in LTE. The NCR may also include connectivity information such as the IP address of the corresponding cell, information about the configurations of the X2 and S1 interfaces, and parameters needed for different radio resource management control algorithms, such as handover thresholds. Information about the radio access technology (RAT) (e.g., LTE, WCDMA, or GSM) as well as other capabilities of the target cell may also be included in the NCR.

Some cellular systems such as LTE/4G and NR/5G supports the automatic neighbour relations (ANR) function, where information about neighbour cells are automatically retrieved and interfaces such as X2 can automatically be setup. FIG. 2a (FIG. 22.3.3-1 in 3GPP TS 36.300) illustrates the operation of ANR, see 3GPP TS 36.300 for more details. A UE is served by cell A and is close to cell B. The UE detects and reports the PCI (=5) of cell B to its serving cell A. Cell A reconfigures the UE to detect the broadcast control channel (BCCH) of cell B and decode the global identifier of cell B. The UE will then report the global identifier of cell B to the serving cell A, which means that cell A will get the unique identifier of cell B and an association to its physical cell identifier.

Cell A uses the established information from ANR to automatically create entries in the Neighbour Cell Relation Table (NCRT), which lists neighbour cells for a specific cell. The information can be used to establish X2 between base stations serving cell A and cell B respectively, and to uniquely identify the target cell for subsequent reports of PCI=5.

For each cell that the eNB has, the eNB keeps a NCRT, as illustrated by FIG. 2b (FIG. 22.3.2a-1 in 3GPP TS 36.300). For each NCR, the NCRT contains the Target Cell Identifier (TCI), which identifies the target cell. For LTE, the TCI corresponds to the ECGI and PCI of the target cell. Furthermore, each NCR has three attributes, the NoRemove, the NoHO and the NoX2 attribute. These attributes have the following definitions:

No Remove: If checked, the eNB shall not remove the Neighbour Cell Relation from the NRT.

No HO: If checked, the Neighbour Cell Relation shall not be used by the eNB for handover reasons.

No X2: If checked, the Neighbour Cell Relation shall not use an X2 interface in order to initiate procedures towards the eNB parenting the target cell.

Neighbour Cell Relations are cell-to-cell relations, while an X2 link is set up between two eNBs. Neighbour Cell Relations are unidirectional, while an X2 link is bidirectional. The ANR function also allows the Operations and Management (O&M) system to manage the NCRT. O&M can add and delete NCRs. It can also change the attributes of the NCRT. The O&M system is informed about changes in the NCRT.

In cellular systems, there are also different kinds of positioning mechanisms. These mechanisms can be divided into two categories:
  Dedicated positioning mechanisms;
  Specific for a radio access technology such as LTE;
  Independent of a radio access technology such as global navigation satellite systems (GNSS);
  Other mechanisms.

The dedicated positioning mechanisms in cellular networks were initially introduced to support regulatory positioning of emergency calls, but has changed over time to also address positioning in other scenarios and for other use cases, such as device positioning for logistics and asset tracking, navigation, etc. These mechanisms are based on dedicated positioning signals and/or dedicated procedures for positioning, and primarily, the device is connected to the network.

The other mechanisms are typically introduced to monitor the position of the device in order to initiate a connection to the device in order to establish a call or send data, or to move the connection while ongoing to maintain an acceptable quality when the device moves around. The accuracy of the other mechanisms is typically worse than with the dedicated positioning technologies.

Information about when users cross a specific border can be determined based on positioning of the users via their respective UEs. The problem with dedicated positioning mechanisms in cellular networks is that they are not generally supported by all devices and essentially only applicable in connected mode, which means that idle mode users passing the border will not be detected. The problem with other positioning methods using existing communication infrastructure is that it is not accurate enough in order to detect when a user passes a border.

SUMMARY OF THE INVENTION

It is an object of the present inventive concept to mitigate, alleviate or eliminate one or more of the above-identified deficiencies in the art and disadvantages singly or in combination.

In brief, the present inventive concept is based on the realization that dedicated communication infrastructure, which can be configured to very locally provide a better received signal power compared to other base stations, can be introduced into existing radio access networks. Such infrastructure may not provide regular communication services and may not be integrated in the rest of the communication network. To this end, the dedicated communication infrastructure may be a logical node.

An advantage of the present inventive concept is that idle mode wireless devices, such as UEs, will move to a connected state for a short period of time, enough to trigger a measurement report to the commercial network (the serving cell). Upon receiving the measurement report, and by knowing the geographical location of the node, it can then be determined that a wireless device is in proximity of said geographical location.

The present inventive concept utilizes the fact that a wireless device registered with a base station, e.g. a commercial network base station, will camp the base station while continuing to monitor neighbouring cells at neighbouring base stations as part of a cell reselection procedure. When the wireless device detects a cell served by the node according to the inventive concept, having a higher signal strength than the currently camped base station, and broadcasting a registration area code different from a registration area code of the currently camped base station, the wireless device will initiate a registration procedure towards the node by sending a registration request to the node. The node will respond by rejecting the registration request. To summarize, the node triggers wireless devices to transfer from idle to connected mode, which allows a proximity indication or positioning based on connected mode measurement reports.

According to a first aspect of the inventive concept, these and other objects are achieved in full, or at least in part, by a node for use in positioning of a wireless unit, the node comprising:
  a transmitter arranged to broadcast system information arranged to trigger a registration;
  a receiver arranged to receive registration requests from wireless devices in receipt of the system information,
  wherein the node is arranged to, in response to a registration request received from any wireless device in receipt of the broadcasted system information, transmit, via the transmitter, a response to said any wireless device indicating that the registration request is rejected.

Hereby, a node is provided, the node being configured to always, in response to any registration request from any wireless device, transmit a response indicating that a registration request is rejected. A wireless device receiving such a reject will return to its base station, i.e. the base station to which it was registered before attempting to register with the node, to complete a registration procedure. As will be explained further in the present disclosure, the wireless device will also retrieve a node identifier from the node and report said node identifier to the base station. It can then be deduced, by knowing the geographical location of the node and its identity, that the wireless device is in communication range of the node. A position of the wireless device may thus be achieved.

The receiver may be further arranged to receive communication service requests from said any wireless device in receipt of the system information, and wherein the node is further arranged to, in response to a communication request received from any wireless device in receipt of the broadcasted system information, transmit, via the transmitter, a response to said any wireless device indicating that the communication service request is rejected.

Hereby, wireless devices are prevented from attempting to receive service from the node. The node may be configured to always, in response to any communication service request from any wireless device, transmit a response indicating that a communication service request is rejected. Such action by the node may be desired, especially in case the node does not provide any type of communication service capabilities, since wireless devices would otherwise not be able to e.g. make emergency calls.

The system information may comprise a first registration area code, wherein the node is further arranged to change the first registration area code to a second registration area code when a registration area code update condition is met.

Given the forbidden registration area code list that wireless devices maintain, according to at least some communication standards, for certain reject causes, an update procedure for the registration area code may ensure that not the same registration area code will be used over time, which will allow the node to continue to cause wireless devices to attempt to register with the node.

In other words, since a wireless device may list the node that has sent a registration rejection in a forbidden list, subsequent proximity of the node will not trigger a registration request by the wireless device, unless the registration area code has changed or the entry into the forbidden list has been cleared.

The registration area code update condition may comprise at least one of: a first timer has expired, wherein the first timer is initialized upon transmission of the registration request rejection; a number of registration request rejections transmitted by the node within a time window has exceeded a threshold; and a second timer has expired, wherein the second timer is initialized upon changing the first registration area code to the second registration area code. To this end, it is to be understood that the second timer is initialized upon changing the registration area code, i.e. when a period of time has elapsed since the last change of registration area code, the registration area code update condition may be triggered to cause a change of registration area code.

The first timer and/or the second timer may be preconfigured or configurable via an interface.

The first timer and the second timer may be set to a random value from a preconfigured or configurable value range.

The second registration area code may be selected from a pre-configured or configurable list of reserved registration area codes.

According to a second aspect of the inventive concept, these and other objects are achieved in full, or at least in part, by a method in a node for use in positioning of a wireless unit, the method comprising: broadcasting system information arranged to trigger a registration;

receiving registration requests from wireless devices in receipt of the system information; and in response to a registration request received from any wireless device in receipt of the broadcasted system information, transmitting a response to said any wireless device indicating that the registration request is rejected.

The method may further comprise:

receiving communication service requests from wireless devices in receipt of the system information; and in response to a registration request received from any wireless device in receipt of the broadcasted system information, transmitting a response to said any wireless device indicating that the communication service request is rejected.

The system information may comprise a first registration area code, and the method may further comprise changing the first registration area code to a second registration area code when a registration area code update condition is met.

The registration area code update condition may comprise at least one of: a first timer has expired, wherein the first timer is initialized upon transmission of the registration request rejection; a number of registration request rejections transmitted by the node within a time window has exceeded a threshold; and a second timer has expired, wherein the second timer is initialized upon changing the first registration area code to the second registration area code. Accordingly, the method may further comprise at least one of: initializing the first timer upon transmission of the registration request rejection, and initializing the second timer upon changing the first registration area code to the second registration area code.

The method may further comprise preconfiguring or configuring the first timer and/or the second timer.

The method may further comprise setting the first timer and/or the second timer to a random value from a preconfigured or configurable value range.

According to a third aspect of the inventive concept, these and other objects are achieved in full, or at least in part, by a system for use in positioning of a wireless unit, the system comprising: a node; a wireless device; and a base station, wherein the node comprises: a first transmitter arranged to broadcast system information arranged to trigger a registration; a first receiver arranged to receive registration requests from wireless devices in receipt of the system information, wherein the node is arranged to, in response to any registration request received, transmit, via the first transmitter, a response indicating that the registration request is rejected; wherein the wireless device comprises: a second receiver arranged to receive broadcasted system information from the node; a second transmitter arranged to transmit a registration request to the node, wherein the wireless device is further arranged to: receive, via the second receiver, a response from the node indicating that the registration request is rejected.

The node is further arranged to transmit, via the first transmitter, a node identifier indicating an identity of the node; and the wireless device may be further arranged to receive, via the second receiver, the node identifier from the node, and transmit, via the second transmitter, the node identifier to the base station.

Further to what has been described above in relation to the first and second aspects of the inventive concept, embodiments of the third aspect of to the inventive concept provide a system comprising a node, a wireless device, and a base station. The node, causing wireless devices to attempt to register with the node and subsequently rejecting the requests for such a registration, provides wireless devices with a node identifier. The node identifier is further reported to the base station by the wireless device. Using the node identifier and a record of the geographical location of the node having said node identifier, it can be deduced that the wireless device having reported said node identifier has attempted to register with the node corresponding to said node identifier, and hence that the wireless device is in communication range, or proximity, of the node. A positioning of the wireless device may thus be achieved.

A record of the geographical location of one or several nodes according to the inventive concept may be stored in a database. The database need not necessarily be kept by the base station or a commercial network. Instead, the database may be kept and accessed by a central provider, the central provider being configured to receive, from the base station or commercial network, a node identifier and an identifier associated with the wireless device which has reported said node identifier. Based on the received node identifier and the identifier associated with the wireless device, a determination can be made, at the central provider, that the wireless device is in communication range, or proximity, of the node associated with said node identifier.

The wireless device may be further arranged to transmit, via the second transmitter, a wireless device identifier indicating an identity of the wireless device.

The node may be further arranged to receive, via the first receiver, the wireless device identifier, and determine, based on the wireless device identifier, that the wireless device is in communication range of the node.

Further to what has been described above in relation to the first and second aspects of the inventive concept, embodiments of the third aspect of to the inventive concept provides a system comprising a node, a wireless device. The node, causing a wireless device to attempt to register with the node and subsequently rejecting the request for such a registration, receives a wireless device identifier from the wireless device. Using the wireless device identifier and a record of wireless device identifiers, it can be deduced that the wireless device having the wireless device identifier has attempted to register with the node corresponding to said node identifier, and hence that the wireless device is in communication range, or proximity, of the node. A positioning of the wireless device may thus be achieved.

A record of the wireless device identifiers may be stored in a database. The database need not necessarily be available at the node. Instead, the database may be kept and accessed by a central provider, the central provider being configured to receive, from the node, a wireless device identifier and an optionally a node identifier associated with the node. Based on the received wireless device identifier and the node identifier, a determination can be made, at the central provider, that the wireless device is in communication range, or proximity, of the node associated with said node identifier.

The node is further arranged to, in response to any communication service request received, transmit, via the first transmitter, a response indicating that the communication service request is rejected; wherein the second transmitter is further arranged to transmit a communication service request to the node; and wherein the wireless device is further arranged to receive, via the second receiver, a response from the node indicating that the communication service request is rejected.

The base station may be configured to determine, based on the node identifier, that the wireless device is in communication range of the node.

The base station may be arranged to transmit, to the wireless device, a request to retrieve and report, from the node, a further node identifier indicating the identity of the node;
  wherein the node is further arranged to transmit, via the first transmitter, the further node identifier to the wireless device; and
  wherein the wireless device is further arranged to transmit, via the second transmitter, the further node identifier to the base station.

Hereby, identification of the node may be achieved in case e.g. the node identifier is not considered locally unique by the base station The request to retrieve and report the further node identifier may be initiated by the base station upon determination, by the base station, that the identity of the node cannot be determined based on the node identifier.

According to a fourth aspect of the inventive concept, these and other objects are achieved in full, or at least in part, by a method in a system, the method comprising:
  broadcasting, from a node, system information arranged to trigger a registration;
  receiving, in a wireless device, the broadcasted system information from the node;
  transmitting, from the wireless device, a registration request to the node;
  receiving, in the node, the registration request from the wireless device;
  transmitting, from the node, in response to any registration request received, a response indicating that the registration request is rejected;
  receiving, in the wireless device, the response from the node indicating that the registration request is rejected.

The method may further comprise:
  transmitting, from the node, a node identifier indicating an identity of the node;
  receiving, in the wireless device, the node identifier from the node; and
  transmitting, from the wireless device, the node identifier to a base station.

The method may further comprise:
  transmitting, from the wireless device, a wireless device identifier indicating an identity of the wireless device to the node;
  receiving, in the node, the wireless device identifier from the wireless device;
  determine, in the node, based on the wireless device identifier that the wireless device is in communication range of the node.

The method may further comprise:
  transmitting, from the wireless device, a communication service request to the node;
  receiving, in the node, the communication service request from the wireless device;
  transmitting, from the node, in response to any communication service request received, a response indicating that the communication service request is rejected; and
  receiving, in the wireless device, the response from the node indicating that the communication service request is rejected.

The method may further comprise determining, via the base station and based on the node identifier, that the wireless device is in communication range of the node.

The method may further comprise transmitting, from the base station to the wireless device, a request to retrieve and report, from the node, a further node identifier indicating the identity of the node;

transmitting, from the node via the first transmitter, the further node identifier to the wireless device; and transmitting, from the wireless device via the second transmitter, the further node identifier to the base station.

The method may further comprise initiating, by the base station, the request to retrieve and report the further node identifier upon determination, by the base station, that the identity of the node cannot be determined based on the node identifier. Accordingly, the method may further comprise determining that the identity of the node cannot be determined based on the node identifier.

Initially, some terminology may be defined to provide clarification for the following disclosure.

The term "UE" may be interchangeably used throughout the present disclosure with the term "wireless device". A wireless device may be a mobile radio terminal, a mobile device, a mobile station, a smartphone, or the like.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of the present inventive concept, with reference to the appended drawings, wherein.

The figures are not necessarily to scale, and generally only show parts that are necessary in order to elucidate the inventive concept, wherein other parts may be omitted or merely suggested.

DETAILED DESCRIPTION

A node 30 for use in positioning of a wireless unit according to the inventive concept will now be described with reference to FIGS. 3a and 3b.

Figure 1:
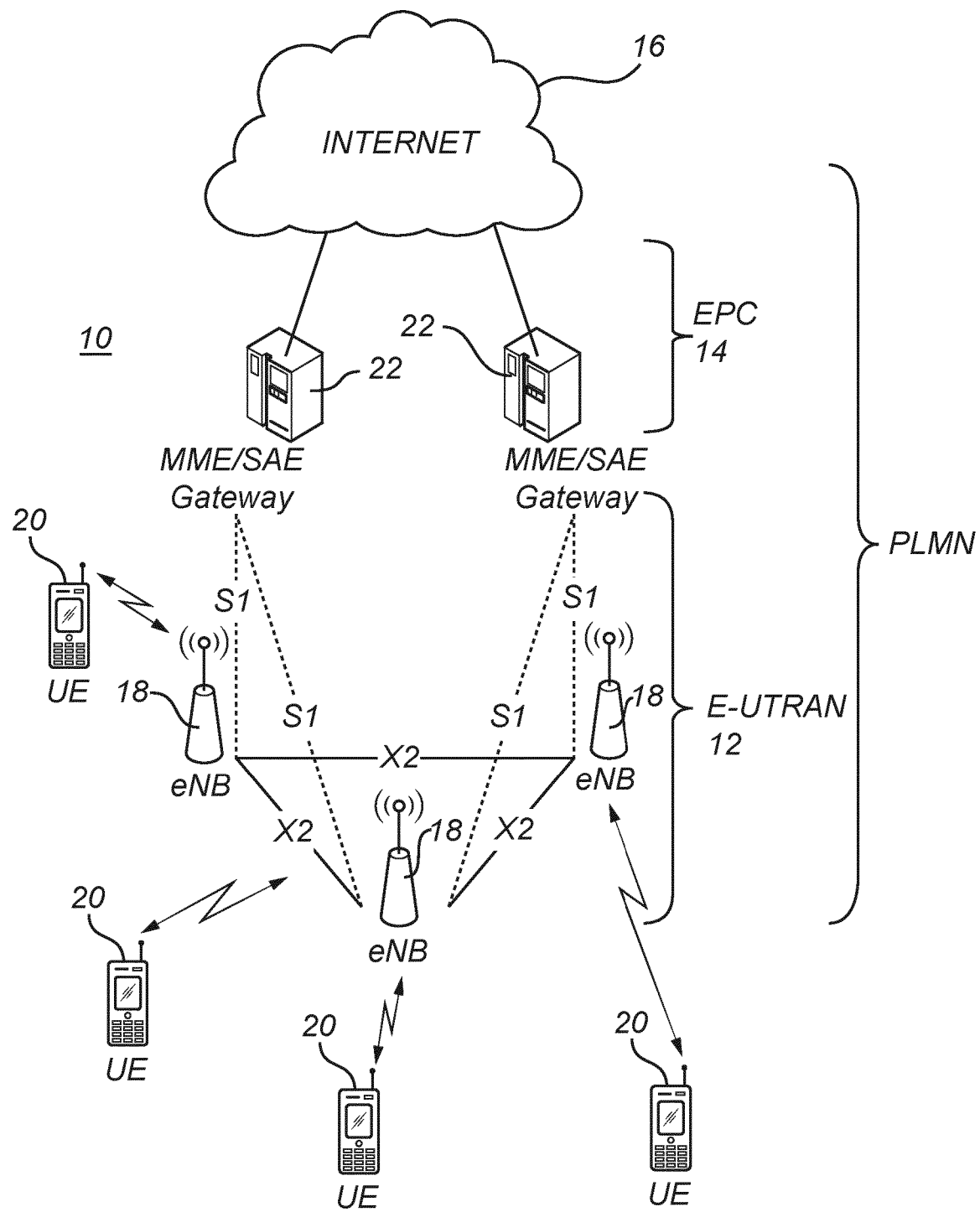
FIG. 1 schematically illustrates a prior art LTE architecture.
Figure 2A:
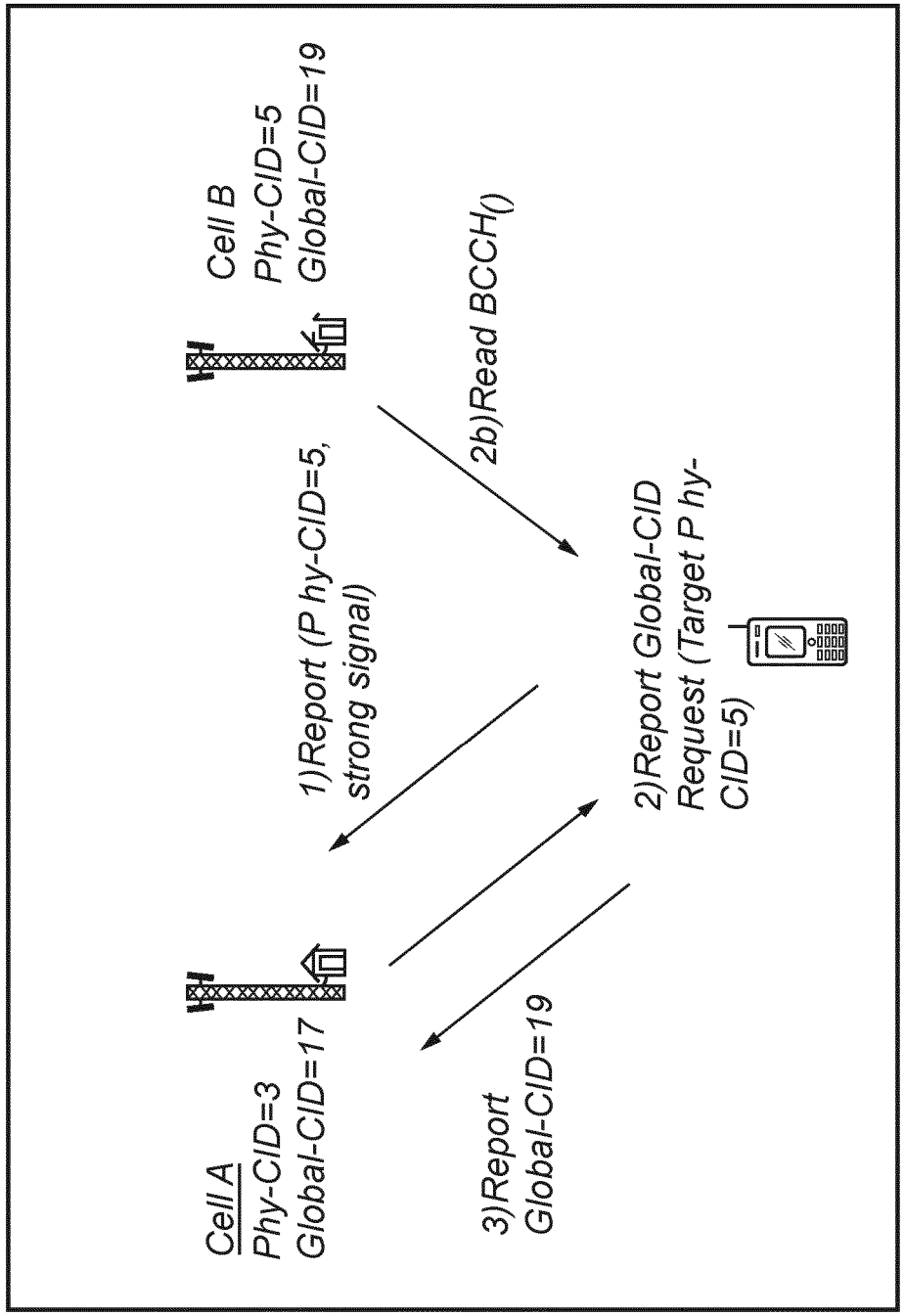
FIG. 2a schematically illustrates a prior art Automatic Neighbour Relation (ANR) Function.
Figure 2B:
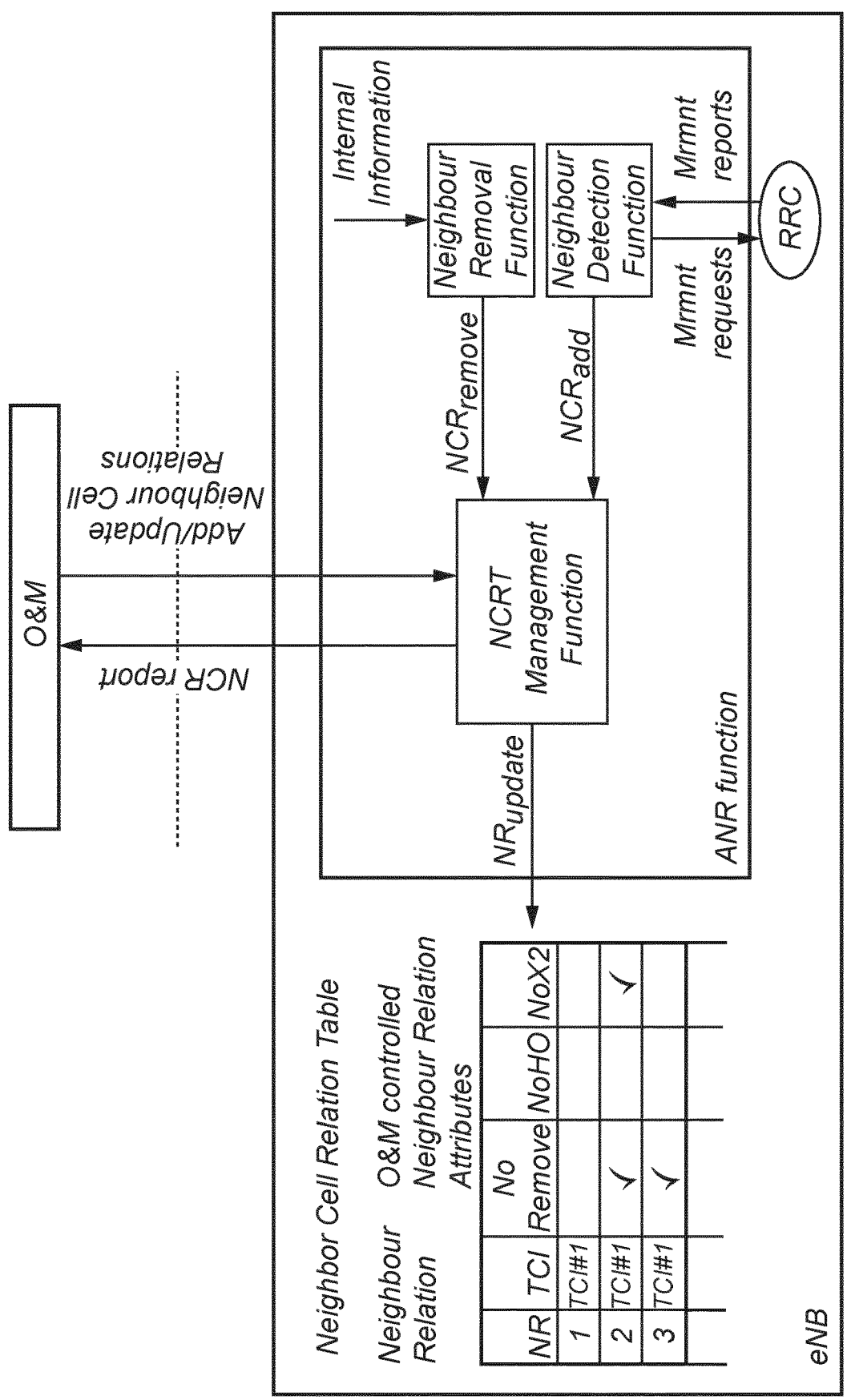
FIG. 2b schematically illustrates prior art interaction between eNB and Operation and Maintenance (O&M)
Figure 3A:
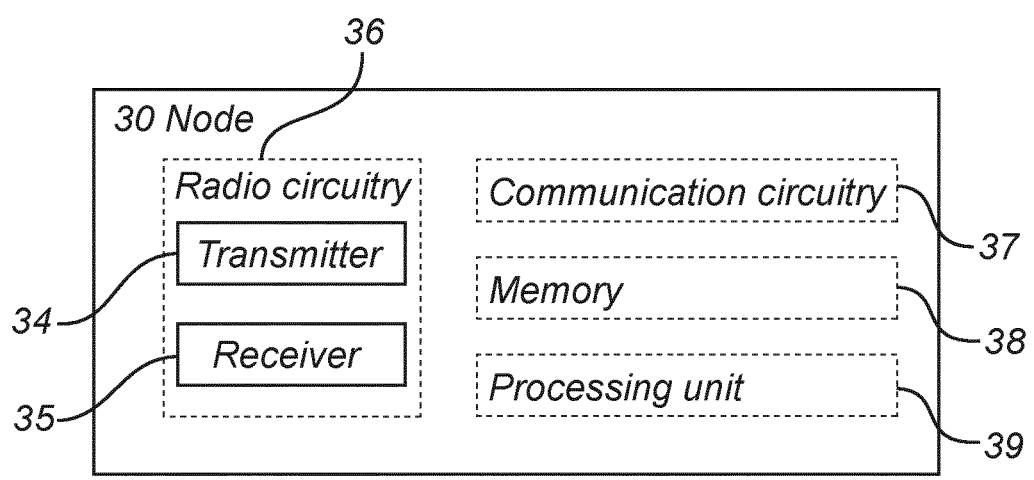
FIG. 3a is a schematic block diagram of a node according to the inventive concept.

As illustrated in FIG. 3a, the node 30 comprises a transmitter 34 arranged to broadcast system information. The system information is arranged to trigger a registration. For example, the system information may be arranged to trigger a wireless device that receives the broadcasted system information to attempt registering with the node 30, such as by transmitting a registration request to the node 30. The node 30 then further comprises a receiver 35 arranged to receive registration requests from wireless devices in receipt of the system information. The node 30 is arranged to, in response to a registration request received from any wireless device in receipt of the broadcasted system information, transmit, via the transmitter 35, a response to said any wireless device indicating that the registration request is rejected. Thus, the node 30 is arranged to always reject registration requests from wireless devices.

The arrangement of the system information broadcasted by the node 30 to trigger a registration attempt from any wireless device in receipt of the system information is aimed at moving an idle mode wireless device to a connected state at least for a short period of time. This will enable triggering a process in which identification of the node 30 is provided to the network to which the wireless device was connected during idle mode. This triggered process may for example be providing a measurement report to a commercial network. Upon receiving the measurement report, and by knowing the geographical location of the node 30, it can then be determined that a wireless device is in proximity of said geographical location (coverage area of the node 30).

The receiver 35 may be further arranged to receive communication service requests from said any wireless device in receipt of the system information. The node 30 may then be further arranged to, in response to a communication request received from any wireless device in receipt of the broadcasted system information, transmit, via the transmitter 34, a response to said any wireless device indicating that the communication service request is rejected. Thus, the node 30 is configured to always reject communication service requests from wireless devices.

System information sent from a node may comprise a registration area code. Such a registration area code indicates which registration area a node sending the registration area code relates to. Generally, if a wireless device receives system information including a registration area code indicating a different registration area than the node it is currently registered with, it will initiate an attempt to register with the node from which the system information was received unless the registration area code is in a forbidden list in the wireless device, which forbidden list indicates that registration attempt should not be initiated. A registration area code may be in a forbidden list e.g. because of a previous attempt to register was rejected.

The system information broadcasted from the node 30 may comprise a first registration area code. As long as the first registration area code is not in a forbidden list of a wireless device in receipt of the system information, the wireless device may send a registration request to the node 30. As the node 30 is arranged to always reject registration requests, the wireless device will then receive a registration reject. Once the wireless device receives the registration reject from the node 30, the first registration area code received in the system information may be added to the forbidden list of the wireless device. Hence, a next time the wireless device is in receipt of the system information including the first registration area code, it will not attempt registering with the node 30. Thus, the node 30 may be further arranged to change the first registration area code to a second registration area code when a registration area code update condition is met. The registration area code update condition comprises at least one of 1) a first timer has expired, wherein the first timer is initialized upon transmission of the registration request rejection; 2) a number of registration request rejections transmitted by the node within a time window has exceeded a threshold; and 3) a second timer has expired, wherein the second timer is initialized upon changing the first registration area code to the second registration area code.

The node 30 may be configured with a list of registration area codes to use, such that when a registration area code update condition is met, a next registration area code of the list is included in the system information broadcasted. For example, when the registration area code update condition is met, the second registration area code is changed to a third registration area code etc.

The first timer and the second timer may be preconfigured or configurable via an interface. The first timer and the second timer may be set to a random value from a preconfigured or configurable value range. The second registration area code may be selected from a pre-configured or configurable list of reserved registration area codes.

A wireless device will generally attempt to register with the node 30 if the registration area code included in the system information broadcasted by the node 30 differs from the registration area code of the node with which the wireless device is currently registered. Hence, any registration area codes of the node 30, such as the first registration area code and the second registration area code, to be included in the broadcasted system information may be selected based on a location of the node 30, such that the registration area codes all differ from registration area codes of other nodes in the area.

In implementations in relation to a communications network, the node 30 needs only include a reduced functionality. For example, since the node 30 will always reject registration requests, the node 30 need not provide regular communication services, nor need it be integrated in the rest of the communication network. In fact, providing such a node with reduced functionality, which may be designated reduced functionality node (RFN), will reduce the complexity of the node and its implementation.

The transmitter 34 and the receiver 35 of the node 30 are generally included within radio circuitry 36. The node 30 may also comprise communication circuitry 37 arranged for communicate with other nodes, memory 38 to store information related to the invention, and a processing unit 39.

The radio circuitry 36 including the transmitter 34 and the receiver 35 may be arranged to communicate with wireless devices, including receiving and sending messages from/to the wireless devices, and to broadcast the system information.

The communication circuitry 37 may be arranged to establish communication to support configuration of the node 30, and to interact with wireless devices such as rejecting registration requests.

The memory 38 may be arranged to store information reserved registration codes, rejection causes, and registration code updated conditions and associated parameters.

The processing unit 39 may be arranged to decode requests received by means of the receiver 35 and encode rejections for transmission by means of the transmitter 34, and also to trigger registration area code updates based on configurable parameters as will be described further in relation to FIGS. 7 and 8.

Figure 3B:
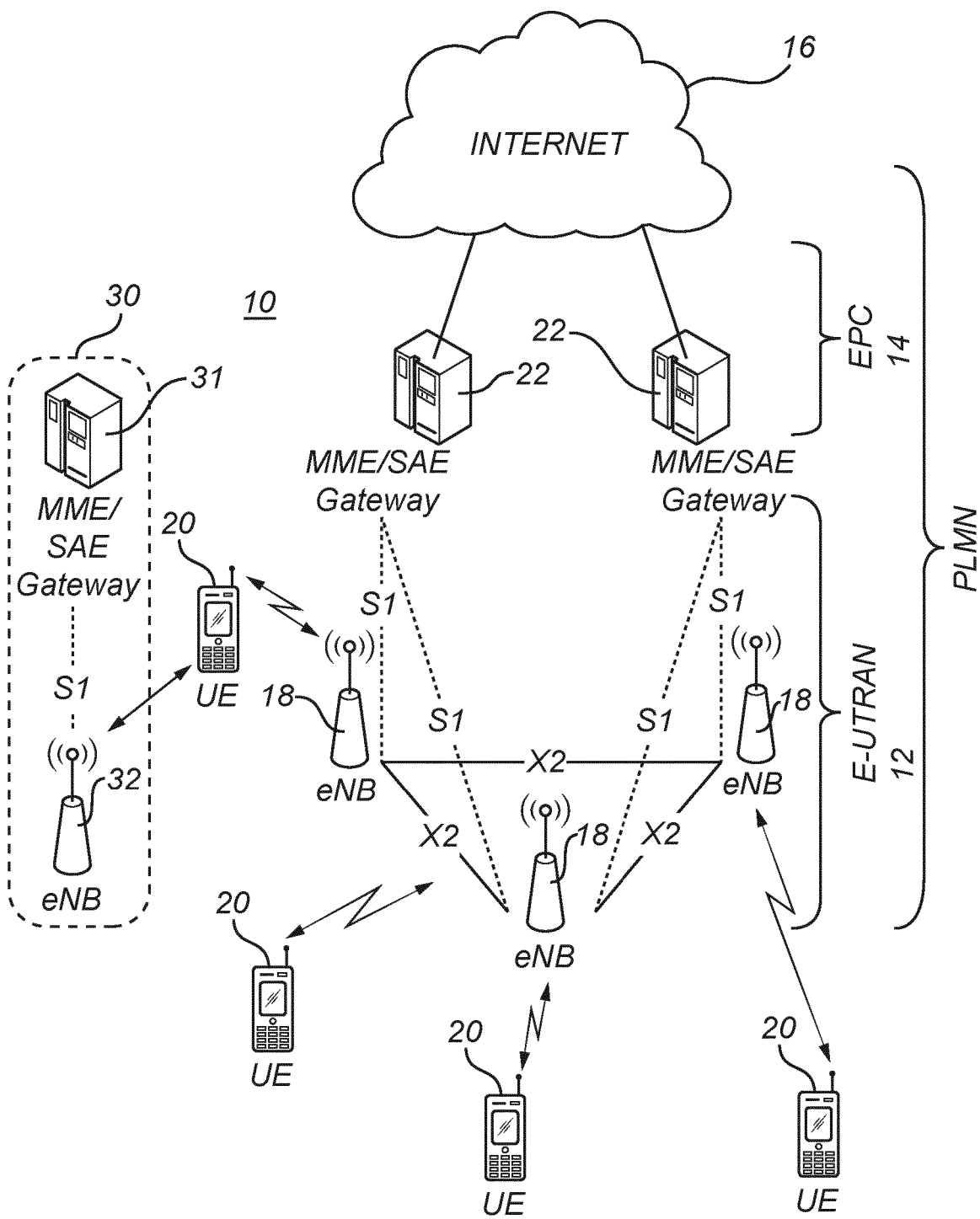
FIG. 3b schematically illustrates a node according to the inventive concept together with an LTE architecture.

Turning to FIG. 3b, which discloses an implementation of the node 30 in relation to a communication system schematically illustrates as an LTE architecture 10. The node 30 comprises MME/S-GW 31 functionality and radio base station/eNB 32 functionality. These functionalities may be combined into one physical entity. In alternative, these two functionalities are separated into different physical entities. In the latter, the radio base station part may be one physical entity, connected to the MME/S-GW part as one separate physical entity. In alternative, the radio base station part is one physical entity, connected to a cloud/server/calculation platform which realizes an MME/S-GW part. In yet another embodiment, the RFN architecture can imply a split into two of more physical entities depending in where the functionality is assigned. For example, the radio base station/eNB 32 functionality may be located at one physical location and the MME/S-GW 31 functionality may be located at another location, such as in a cloud-based system or in an operator network. In relation to FIG. 3, this would imply that radio circuitry 36 including the transmitter 34 and receiver 35 may be located at one physical location and the communication circuitry 37, memory 38, and processing unit 39 may be located at another location, such as in a cloud-based system or in an operator network.

When implementing the node 30, e.g. in relation to a communication system as illustrated in FIG. 3b, the physical location of the physical entity comprising the node 30, and specifically comprising an antenna or antenna system (not shown) of the node 30 is relevant. Preferably, the physical location and orientation of the physical entity comprising the antenna or antenna system of the node 30 should be selected such that an area within which a communication signal, e.g. including the system information broadcasted by the node 30, is high is well defined and suitably small. As such, the location of a wireless device, such as the UE 20, can be determined to be within such a well defined and small are when identified to be in receipt of the broadcasted system information and at a signal strength above a threshold for triggering the UE 20 to attempt registration with the node 30. Typically, the UE 20 will be triggered to attempt registration with the node 30 if a measure of signal strength and/or signal quality in relation to the node 30 indicates a higher signal strength and/or signal quality than the current node the UE 20 is registered with. As an example, it may be of interest to identify if a wireless device has been brought into a specific building. The physical location and orientation of the physical entity comprising the antenna or antenna system of the node 30 should then be selected such that the UE 20 will only be in receipt of the broadcasted system information from the node 30 and at a signal strength above a threshold for triggering the UE 20 to attempt registration with the node 30, if the UE 20 is within the building, e.g. within a certain area inside the entrance of the building.

Even if the node 30 has been illustrated and described in relation to an LTE communications network in FIG. 3b, it will be appreciated that the inventive concept is not limited to any specific technology.

Figure 4:
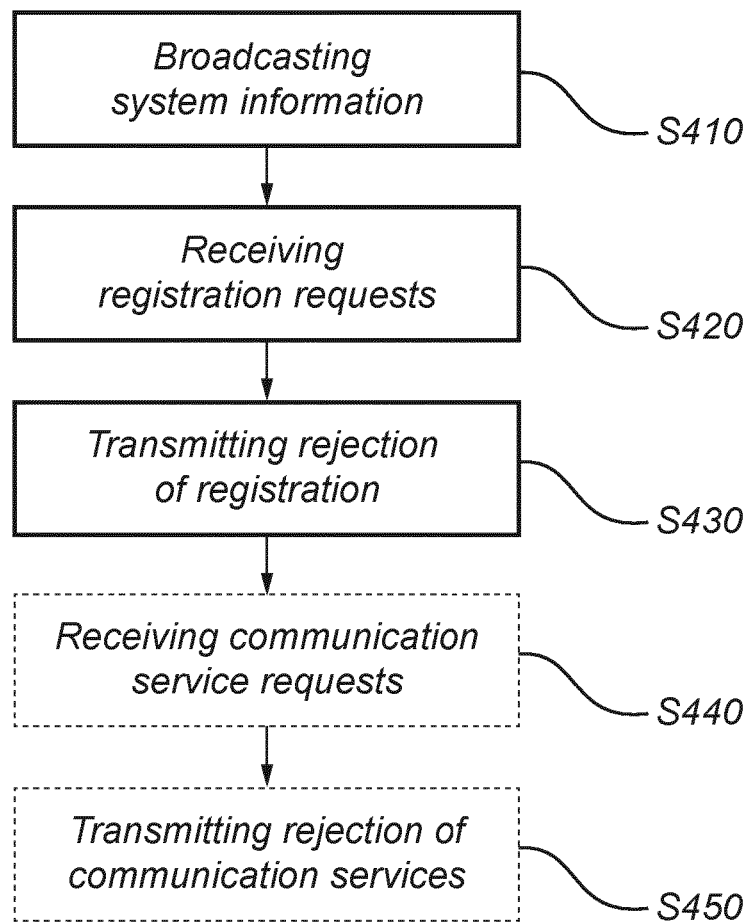
FIG. 4 is a flowchart of a method according to the inventive concept.

A method 400 for use in positioning of a wireless unit according to the inventive concept will now be described with reference to FIG. 4 illustrating steps from a network node perspective. For clarity and simplicity, the method 400 will be described in terms of 'steps'. It is emphasized that steps are not necessarily processes that are delimited in time or separate from each other, and more than one 'step' may be performed at the same time in a parallel fashion unless otherwise is specified.

The method 400 comprises broadcasting S410 system information arranged to trigger a registration, receiving S420 registration requests from wireless devices in receipt of the system information, and transmitting S430 in response to a registration request received from any wireless device in receipt of the broadcasted system information, a response to said any wireless device indicating that the registration request is rejected.

The method 400 may further comprise receiving a communication service requests from wireless devices in receipt of the system information, and transmitting, in response to a registration request received from any wireless device in receipt of the broadcasted system information, transmitting a response to said any wireless device indicating that the communication service request is rejected, such as a response indicating that no communication service is available.

An advantage of the proposed solution is that idle mode wireless devices will move to a connected state for a short period of time, enough to trigger a measurement report to a commercial network. Thereby, it is possible to establish a proximity indication in both idle and connected state. At the same time, as the wireless devices will always receive a registration rejection, there is no risk of disruption of the communication of the wireless devices.

Figure 5:
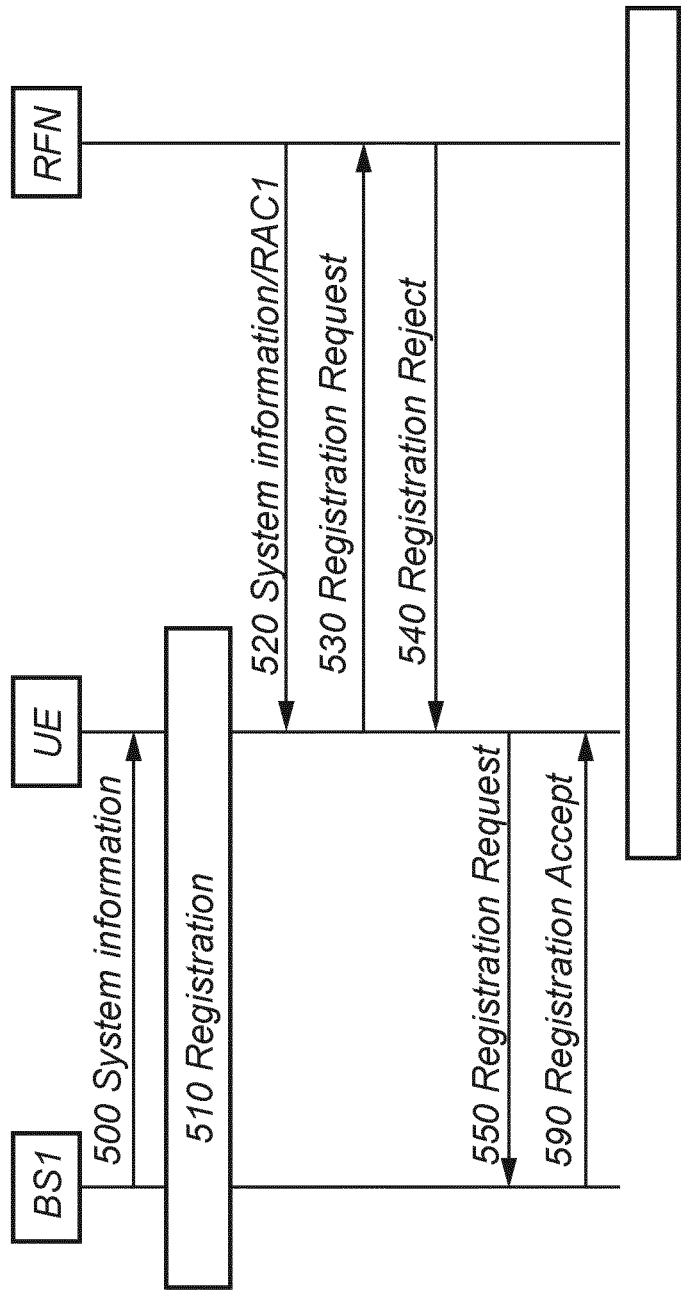
FIG. 5 is a signalling chart in relation to the method according to the inventive concept illustrated in FIG. 4.

FIG. 5 a signalling chart in relation to the method according to the inventive concept illustrated in FIG. 4 as implemented in relation to LTE. A communication service request in LTE is an attach request, which is sent from the UE to the MME. The main purpose of the communication service request rejection from the RFN is to ensure that UEs do not try to camp on the RFN nor try to establish a connection to the RFN for communication services, such as emergency calls. The rejection cause in LTE can for example be one of the following (other rejection causes are not precluded):
  10, Implicitly detached
  12, Tracking Area not allowed
  15, No Suitable Cells In tracking area The registration rejection signalling procedure is illustrated by FIG. 5. A commercial network base station BS1 (cf. base station 18 in FIG. 3b) broadcasts 500 system information, and the UE detects the base station and decodes the information provided in the system information broadcast including the registration code. As part of normal operation, the UE camps on the BS1 cell by initiating a registration procedure 510. In LTE, this is denoted a Tracking Area Update Procedure. Once registered, the UE continues to monitor neighbour cells at neighbour base stations as part of the cell reselection procedure. In 520, the UE detects a cell served by RFN at a higher signal strength, broadcasting a registration code RAC1 that is different from the registration code the UE is camping on. In LTE, the registration code is denoted a tracking area code (TAC). Therefore, the UE will initiate a registration procedure towards the RFN by sending a registration request 530 to the RFN. In LTE, this means that the UE is sending a Tracking Area Update Request to the RFN.

In one embodiment, the RFN retrieves a UE identifier from the registration request. In LTE this identifier can be a Globally Unique Temporary ID (GUTI). Based on the identifier and a user identifier database the RFN, or a node to which the RFN signals the UE identifier, can identify the UE and thereby make the proximity association between the UE and the RFN. In LTE the user identifier database can be a GUTI database per MME. Either a GUTI database is available to RFN or RFN signals the GUTI of the UE to a node with access to a GUTI database.

In 540, the UE obtains a registration rejection (Tracking Area Update Reject in LTE) from the RFN, including a rejection cause. The rejection cause in LTE can for example be one of the following (other rejection causes are not precluded):
  10, Implicitly detached
  12, Tracking Area not allowed
  15, No Suitable Cells In tracking area Due to the rejection, the UE may add the RAC1 of the RFN to its forbidden list of cells. The UE will return to the BS1 (or some other base station that might be more favourable) to complete a registration procedure by transmitting a registration request 550 to the BS1 and the BS1 accepting the registration request by transmitting a registration accept 590.

Figure 6:
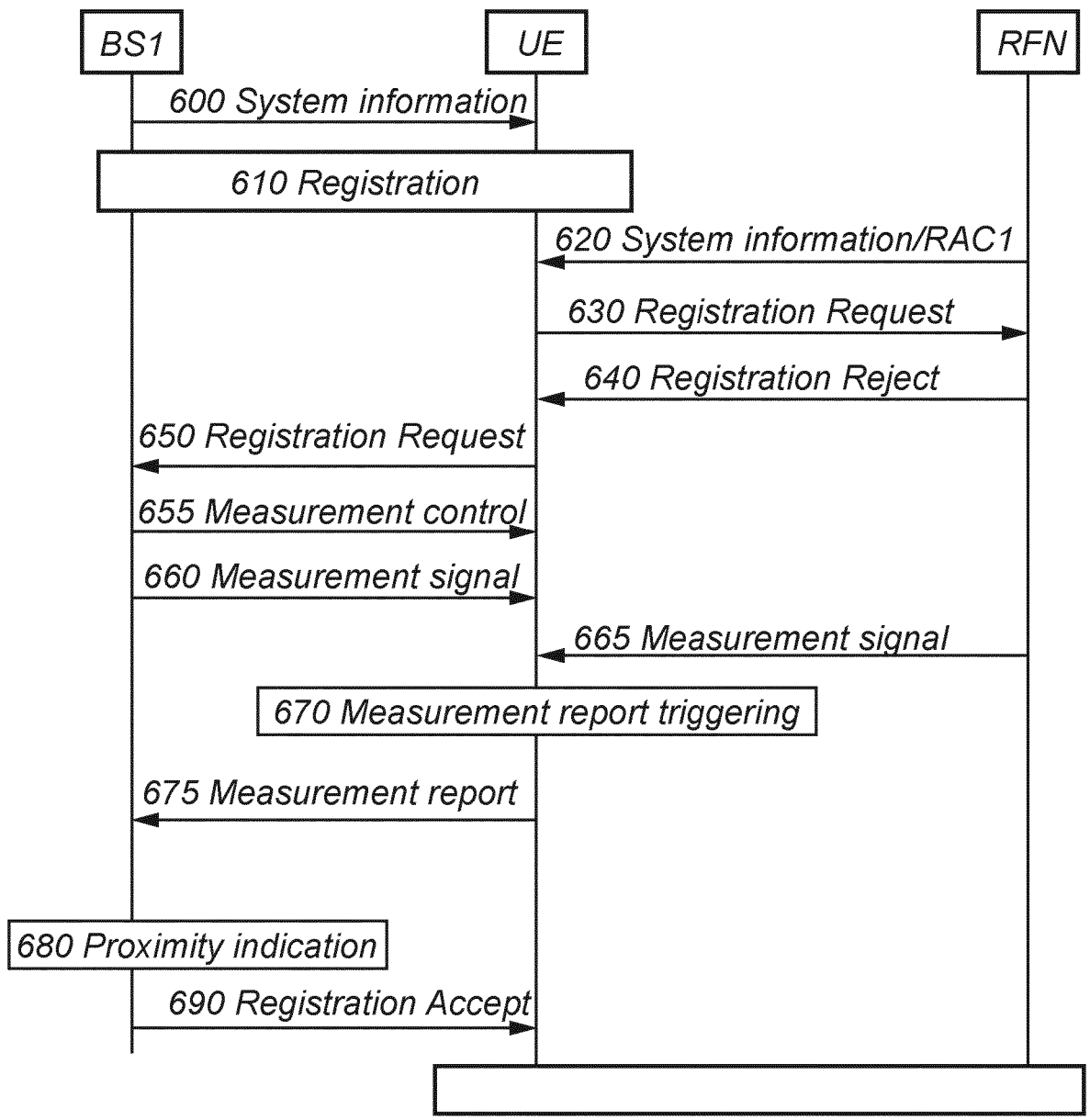
FIG. 6 is a signalling diagram in relation to a further method according to the inventive concept.

Reference is now made to FIG. 6 showing a signalling chart further including measurement report triggering.

Connected mode mobility between cells is typically realized via event triggered measurement reports indicating to a serving cell that a neighbour cell is more favourable. FIG. 6 extends the steps of FIG. 5, where steps 600-650, 690 are the same as 500-550, 590. FIG. 6 provides a signalling chart including also the mobility measurement reports that will be triggered due to the idle to connected mode transitions described in FIGS. 4 and 5, which enables proximity indications. When the UE has initiated the registration procedure towards BS1, the BS1 will configure measurements and report triggering condition of the UE 655. The UE will measure the BS1 cell signature signal 660 and may also measure an RFN cell signature signal 665. Since the UE is in favourable radio conditions with the RFN, the UE may (most likely since the RFN triggered the registration 630) trigger a measurement report 670 to report to BS1 675 an RFN cell including the physical cell identity of the RFN cell triggering the report condition.

The measurement report is used for the proximity indication, disclosing that the UE is in proximity with a cell with the reported PCI 680.

The set of possible PCIs of RFN cells may be in a reserved PCI list for RFNs. If the PCIs in the reserved PCI list are only used for RFNs, then the serving cell can disclose that a specific measurement report has been triggered due to an RFN by comparing the reported PCI with the PCIs in the reserved PCI list.

The serving cell may consider one of more of the following actions due to a measurement report with a PCI on the reserved PCI list:
  1. If the reserved PCI list is sufficiently long and the RFN PCIs are considered to be locally unique (a cell in the commercial network is neighbour to RFN cells configured with different PCIs), then the serving cell can uniquely identify an RFN cell by its reported PCI.
  2. If the reserved PCI list is not sufficiently long and/or the RFN PCIs are not considered to be locally unique, the serving cell cannot uniquely identify an RFN cell by its reported PCI. Instead, the serving cell has to instigate the ANR function to request the UE to retrieve and report also the cell global identifier of the RFN cell, which ensures the unique identification of RFN cells.
3. If the reserved PCI list is sufficiently long and the RFN PCIs are considered to be locally unique, the serving cell can be configured to not initiate the ANR function
4. Handover procedure is never instigated due to a reported PCI on the reserved PCI list. This can be realized by configuring corresponding parameter in the NCRT.
5. X2 establishment procedure is never instigated due to a reported PCI on the reserved PCI list. This can be realized by configuring corresponding parameter in the NCRT.

Even if the signalling has been illustrated and described in relation to an LTE communications network in FIGS. 5 and 6, it will be appreciated that the inventive concept is not limited to any specific technology.

Figure 7:
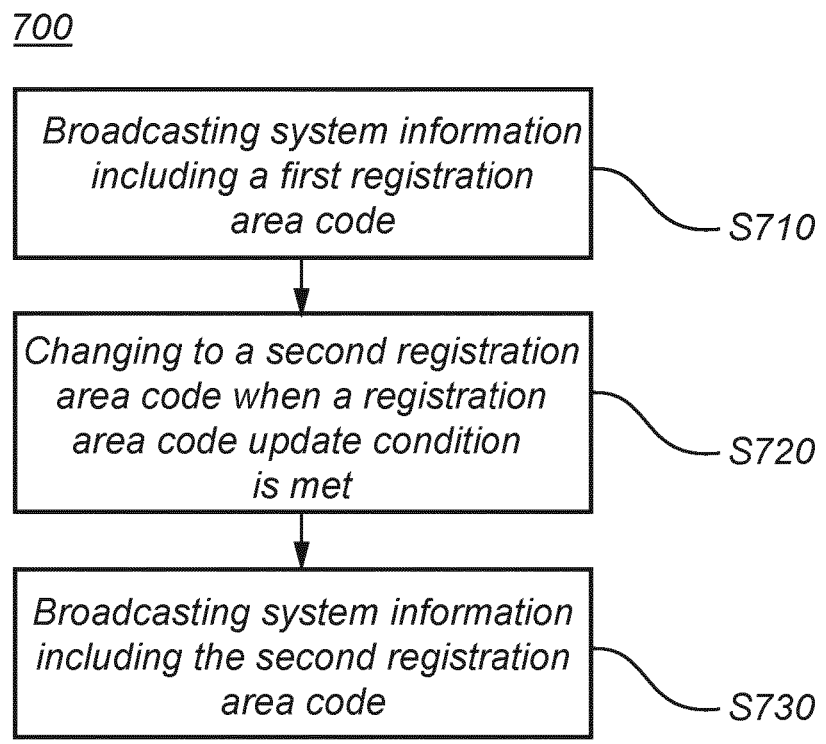
FIG. 7 is a flowchart of a further method according to the inventive concept.

FIG. 7 is a flowchart of a further method 700 according to the inventive concept as performed by a node (RFN) such as the node described in relation to FIGS. 3*a* and 3*b*. The RFN broadcasts S710 system information such as disclosed in relation to FIG. 4, wherein the system information comprises a registration area code in the form of a first registration area code. If a registration area code update condition is met, the RFN changes S720 the registration area code from the first registration area code to a second registration area code when a registration area code. In step 730, the RFN then broadcasts S730 system information including the second registration area code.

Since UEs may list RFN cells that has sent registration rejections in a forbidden list, subsequent proximity of the RFN cell will not trigger a registration if a same registration area code is included in the system information. Therefore, the RFN may update the registration area code as described by the steps in FIG. 7.

Figure 8:
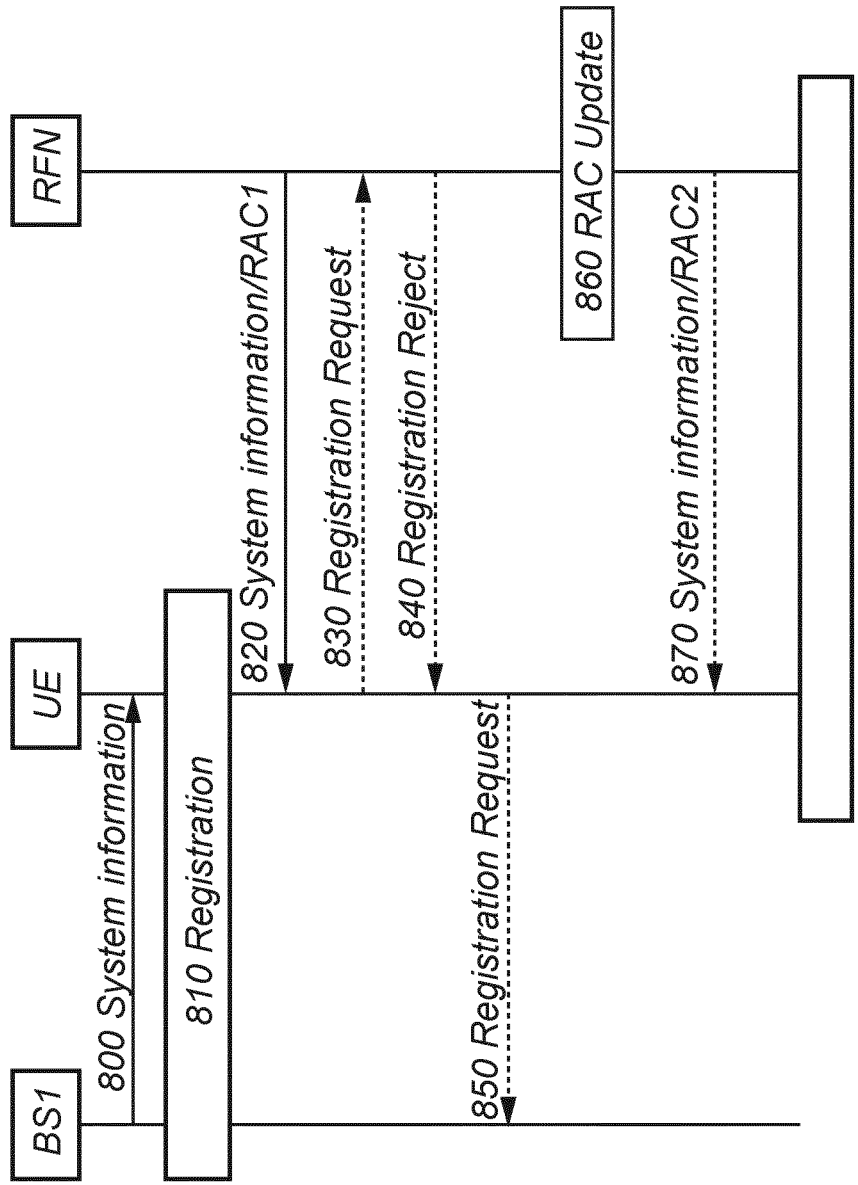
FIG. 8 is a signalling chart in relation to the further method according to the inventive concept illustrated in FIG. 7.

FIG. 8 is a signalling chart in relation to the further method according to the inventive concept illustrated in FIG. 7.

The signalling steps are described in FIG. 8, where steps 810, 810 and 820 are the same as 500, 510 and 520 respectively (and the same as 600, 610 and 620 respectively). Steps 830, 840 and 850 are the same as 530, 540 and 550 respectively (and the same as 630, 640 and 650 respectively), but are optional. When the registration area code update condition is met, the RFN changes RAC from a first registration area code RAC1 to a second registration area code RAC2 860. The RFN cell broadcasts 870 system information comprising the updated registration area code RAC2.

The registration update condition can be one or more of the following
A timer since the last registration rejection has expired
A timer since the last communication service rejection has expired
A timer since the last registration rejection has expired
The number of registration rejections within a time window exceeds a threshold
A timer since the last registration area code update has expired (e.g. RAC is updated every 30 minutes).

The timers can be pre-configured or are configurable via some interface, either wired or wireless. The timers can also be initialized with some randomness, such as a time between 30 mins and 60 mins.

The RACs that the RFN selects from can be from a configurable list of RACs, reserved for RFNs. The RFN can obtain the RAC list via some interface, either wired or wireless.

As is readily appreciated by the person skilled in the art, many modifications and variations may be devised given the above description of the principles of the inventive concept. It is intended that all such modifications and variations be considered as within the scope of the inventive concept, as it is defined in the appended patent claims.

What is claimed is:

1. System for use in positioning of a wireless unit, the system comprising:
a node;
a base station; and
a wireless device,
wherein the node comprises:
a first transmitter arranged to broadcast system information arranged to trigger a registration, wherein the system information comprises a first registration area code;
a first receiver arranged to receive registration requests from wireless devices in receipt of the system information,
wherein the node is arranged to:
in response to any registration request received, transmit, via the first transmitter, a response indicating that the registration request is rejected, and to change the first registration area code to a second registration area code when a registration area code update condition is met; and
transmit, via the first transmitter, a node identifier indicating an identity of the node;
wherein the registration area code update condition comprises at least one of:
a first timer has expired wherein the first timer is initialized upon transmission of the registration request rejection, and
a number of registration request rejections transmitted by the node within a time window has exceeded a threshold;
wherein the wireless device comprises:
a second receiver arranged to receive broadcasted system information from the node;
a second transmitter arranged to transmit a registration request to the node,
wherein the wireless device is further arranged to:
receive, via the second receiver, a response from the node indicating that the registration request is rejected;
receive, via the second receiver, the node identifier from the node, and
transmit, via the second transmitter, the node identifier to the base station.

2. The system of claim 1, wherein the wireless device is further configured to:
transmit, via the second transmitter, a wireless device identifier indicating an identity of the wireless device to the node, and
wherein the node is further arranged to:
receive, via the first receiver, the wireless device identifier, and
determine, based on the wireless device identifier, that the wireless device is in communication range of the node.

3. The system of claim 1, wherein the node is further arranged to, in response to any communication service request received, transmit, via the first transmitter, a response indicating that the communication service request is rejected;

wherein the second transmitter is further arranged to transmit a communication service request to the node; and wherein the wireless device is further arranged to receive, via the second receiver, a response from the node indicating that the communication service request is rejected.

4. The system of claim 3, wherein the response indicating that the communication service request is rejected is caused by any of:

Implicitly Detached;

Tracking Area Not Allowed, and

No Suitable Cells In Tracking Area.

5. The system of claim 1, wherein the response indicating that the registration request is rejected is caused by any of:

Implicitly Detached;

Tracking Area Not Allowed, and

No Suitable Cells In Tracking Area.

6. The system of claim 1, wherein the base station is configured to determine, based on the node identifier, that the wireless device is in communication range of the node.

7. The system of claim 1 wherein the base station is arranged to transmit, to the wireless device, a request to retrieve and report, from the node, a further node identifier indicating the identity of the node;

wherein the node is further arranged to transmit, via the first transmitter, the further node identifier to the wireless device; and wherein the wireless device is further arranged to transmit, via the second transmitter, the further node identifier to the base station.

8. The system of claim 7, wherein the request to retrieve and report the further node identifier is initiated by the base station upon determination, by the base station, that the identity of the node cannot be determined based on the node identifier.

* * * * *